United States Patent [19]

Hoyt, III et al.

[11] Patent Number: 5,657,525

[45] Date of Patent: Aug. 19, 1997

[54] FLEXIBLE COUPLINGS WITH WALK-OFF DETECT AND LOCK-ON FEATURE

[76] Inventors: Raymond Earl Hoyt, III, 26602 Via Gaviota, Mission Viejo, Calif. 92691; Jerry L. Hauck, 504 Huval St., Broussard, La. 70518; Tom Artunian, 16291 Sundance La., Huntington Beach, Calif. 92649

[21] Appl. No.: 541,251

[22] Filed: Oct. 12, 1995

Related U.S. Application Data

[62] Division of Ser. No. 321,516, Oct. 12, 1994, abandoned.

[51] Int. Cl.[6] ............................................. F16D 3/52
[52] U.S. Cl. ............................ 29/407.01; 29/525.03; 29/525.04; 29/525.09; 403/348; 464/88; 464/93
[58] Field of Search .................... 29/407.01, 407.09, 29/407.1, 525.01, 525.02, 525.03, 525.04, 525.08, 525.09; 403/348, 349; 464/49, 55, 88, 93

[56] References Cited

U.S. PATENT DOCUMENTS

| | | |
|---|---|---|
| 1,328,366 | 1/1920 | Brown . |
| 1,622,101 | 3/1927 | Francke . |
| 1,952,232 | 3/1934 | Axien . |
| 2,213,277 | 9/1940 | Guy . |
| 2,301,659 | 11/1942 | Ricefield . |
| 2,337,287 | 12/1943 | Williams . |
| 2,343,839 | 3/1944 | Austin . |
| 2,502,790 | 4/1950 | Jenick . |
| 2,629,991 | 3/1953 | Guy . |
| 2,655,798 | 10/1953 | Neher . |
| 2,740,271 | 4/1956 | Beler . |
| 2,924,082 | 2/1960 | Reich . |
| 3,313,124 | 4/1967 | Filepp . |
| 3,362,191 | 1/1968 | Louette . |
| 3,410,112 | 11/1968 | Gawreliuk . |
| 3,729,953 | 5/1973 | Wanzer . |
| 3,732,706 | 5/1973 | Evans . |
| 3,834,182 | 9/1974 | Trask et al. . |
| 4,176,815 | 12/1979 | Davidson et al. ............ 248/589 |
| 4,373,925 | 2/1983 | Fickelscher . |
| 4,662,859 | 5/1987 | Sakai et al. . |
| 5,139,460 | 8/1992 | Hoyt, III et al. . |
| 5,295,911 | 3/1994 | Hoyt, III et al. . |

FOREIGN PATENT DOCUMENTS

| | | |
|---|---|---|
| 1325728 | 1/1994 | Canada . |
| 839967 | 1/1907 | France . |
| 1046417 | 2/1958 | Germany . |
| 2042260 | 3/1972 | Germany . |
| 97473 | 5/1973 | Germany . |
| 12610 | 5/1933 | United Kingdom . |
| 459909 | 1/1937 | United Kingdom . |

OTHER PUBLICATIONS

Formsprag, Elastomeric Couplings, Hi Misalignment Capacity Overload Protection, PTS-093-90.
Applicants' ATRA-FLEX catalog showing prior art couplings.

*Primary Examiner*—Joseph M. Gorski
*Attorney, Agent, or Firm*—Price, Gess & Ubell

[57] ABSTRACT

A flexible coupling of the type having hubs secured to aligned shafts and connected to one another through the use of a flexible belt surrounding the hubs is improved by forming axial and circumferential grooves on the exterior surface of the belt, each circumferential groove lying transverse to and opening into an axial groove. A cooperating metal retainer ring has respective pins formed on its interior surface for insertion into the axial grooves. After a test for gross misalignment has been satisfied, the respective pins are rotated into the circumferential grooves, thereby fixing the retainer ring in position with respect to the flexible belt and coupling.

15 Claims, 2 Drawing Sheets

5,657,525

FLEXIBLE COUPLINGS WITH WALK-OFF DETECT AND LOCK-ON FEATURE

This is a division of prior application Ser. No. 08/321,516, filed on Oct. 12, 1994, and now abandoned.

BACKGROUND OF THE INVENTION

1. Field of the Invention

The invention set forth in this specification pertains to new and improved flexible couplings and, more particularly, to such couplings having a walk-off, gross misalignment detection and lock-on feature.

2. Description of Related Art

Flexible couplings have probably been used since shortly after the advent of the modern machine age for the purpose of transmitting rotation from one shaft to another. Such couplings are normally used in order to accommodate comparatively minor shaft alignment problems such as are occasionally encountered because of manufacturing or assembly errors. Because of the fact that these devices are widely used and have been known and used for many years, many different types of flexible couplings have been proposed, built, and used.

The particular flexible couplings of the type to which this invention pertains have been manufactured in the past so as to include two hubs or hub elements which are adapted to be connected to the shafts joined by the coupling. These hubs are each provided with extending lugs, teeth, or ribs serving as holding means so as to be engaged by corresponding projections on a band-like or belt-like motion transmitting means in order to cause the hubs to rotate in synchronism as one of the shafts is rotated. The bands or belts used in these prior couplings have been flexible, somewhat resilient belts capable of being wrapped around the hubs so that the projections on them engage the holding means on the hubs.

A metal band or ring is typically used to retain the belt in position wrapped around the hubs. The interior of the band is shaped and dimensioned so that the band may be slid axially relative to the hubs during the assembly and disassembly of the coupling so that the band fits over the belt when the coupling is assembled so as to conform closely to the exterior of the belt.

Some coupling designs have provided a pair of oppositely-disposed axial grooves in the outer surface of the belt and a pair of oppositely-disposed pins in the inner surface of the metal band. The pins are located so as to slide into the grooves as the metal band is installed along a line parallel to the axis of rotation of the hubs. The pins thus position the band and provide a degree of retention. However, if the shafts are grossly misaligned, the metal band will "walk-off" the belt, causing the coupling to come apart. The axial grooves have also been provided with an enlarged central portion such that the pins must be forced through the entrance of the axial groove and then "pop" into place in the central portion to give a tactile indication that the metal band is properly positioned with respect to the flexible belt.

OBJECTS AND SUMMARY OF THE INVENTION

The inventors have conceived of a new and improved coupling design and installation method featuring a two-step installation procedure. The procedure utilizes a flexible coupling belt provided with axial grooves and, additionally, with circumferential grooves oriented transverse or perpendicular to the axial grooves. With this structure, a cooperating metal retainer ring is first installed on the flexible belt with a cooperating pin or pins lying in the axial groove or grooves. The coupling is then rotated under operating conditions to determine if there is gross misalignment; i.e., if the ring rotates off the belt. If not, the ring is rotated such that the pins become located or positioned in the transverse circumferential groove, thus fixing the ring in position such that it cannot slide axially with respect to the belt.

BRIEF DESCRIPTION OF THE DRAWINGS

The just-summarized invention will now be more fully explained with reference to the accompanying drawings, of which.

Figure 1:
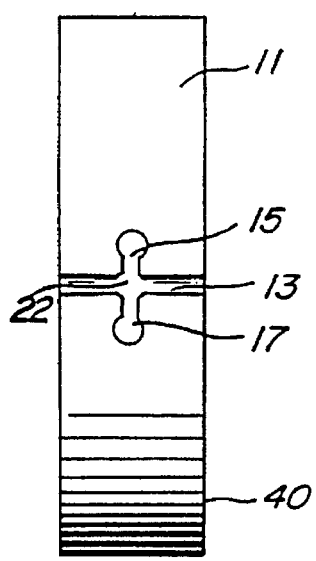
FIG. 1 is a front view of a flexible coupling belt in accordance with the preferred embodiment.

The particular couplings illustrated in the accompanying drawings are constructed so as to embody the concepts and teachings of this invention summarized and defined in the appended claims. Since these concepts and features may be utilized in a variety of somewhat differently appearing and differently constructed flexible couplings through the use of ordinary mechanical engineering skill on the basis of the disclosure embodied in this specification and the accompanying drawings, the invention is not to be considered as being limited to the precise structures illustrated in the drawings and described herein.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a cooperating coupling belt and ring structure which is particularly effective in operation, as well as readily manufactured and installed.

Figure 2:
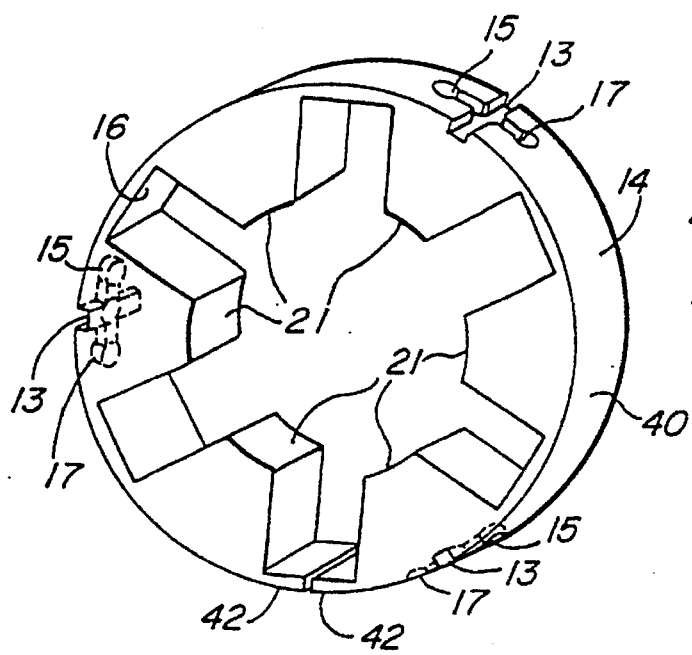
FIG. 2 is a side perspective view of the flexible belt of FIG. 1.
Figure 3:
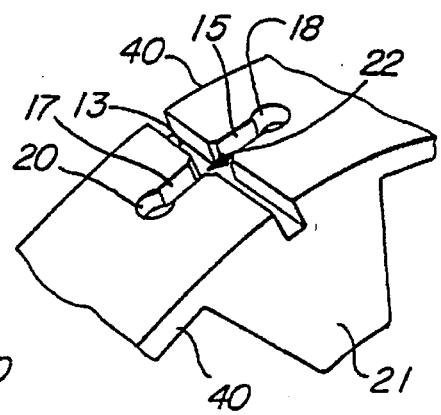
FIG. 3 is a partial perspective view of a segment of the belt of FIG. 1.

FIGS. 1–3 illustrate a flexible belt 11 according to the preferred embodiment. This belt 11 is preferably formed out of a somewhat flexible, somewhat resilient material capable of transmitting a significant rotational force from one hub of a flexible coupling to the other during the use of the coupling. Presently preferred results are achieved by forming the belt 11 out of an appropriate polyurethane having the rotational force transmitting properties indicated. It has been found that a urethane material is particularly desirable because it will give or flex sufficiently to accommodate minor misalignment of rotating shafts without affecting its ability to be utilized over a long period.

As formed, the belt 11 has a generally cylindrical exterior 14, an interior 16, sides or side edges 40, and ends 42 (FIG.

Figure 6:
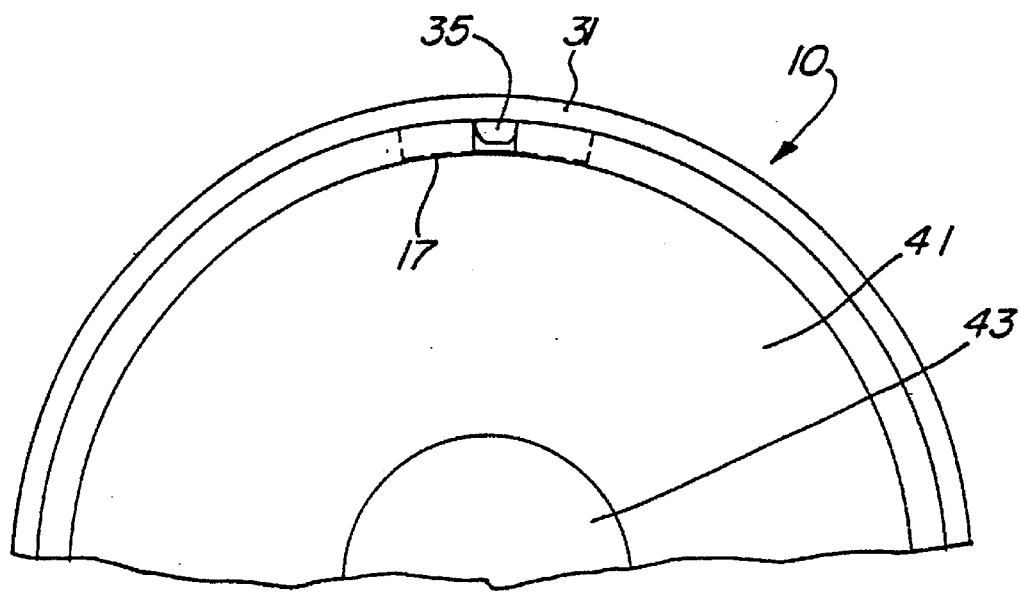
FIGS. 6 and 7 are partial side views of a flexible coupling illustrating the manner of installing a retainer ring and flexible belt thereon, according to the preferred embodiment.

2). The belt 11 will normally be just sufficiently long so that the ends 42 will not quite meet when the belt 11 is located around a pair of hubs, e.g. 41 (FIG. 6). When the belt 11 is in this position, truncated wedge-shaped projections 21 on its interior 16 extend between cooperating teeth on the hubs, e.g. 41, so as to fit closely with respect to all of the teeth, as known in the art. The projections 21 can be considered as interior engagement means on the belt 11 which are employed for the purpose of engaging the hub teeth so as to transmit rotation from one of the hubs to the other of the hubs.

The belt 11 further has axially-disposed grooves or channels 13 in its exterior surface 14. The illustrated embodiment has three such grooves 13 located at equal intervals around the circumference of the exterior surface 14 of the belt 11, i.e. 120 degrees apart.

Figure 4:
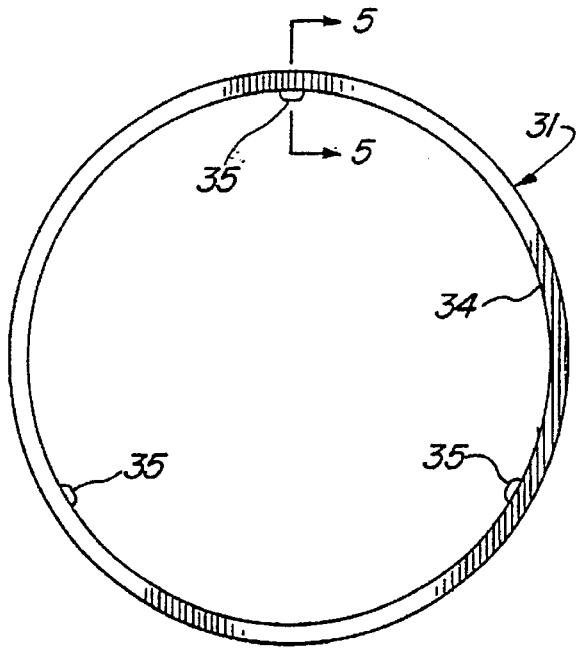
FIG. 4 is a side view of a ring for cooperative installation with the belt of FIGS. 1–3, according to the preferred embodiment.
Figure 5:
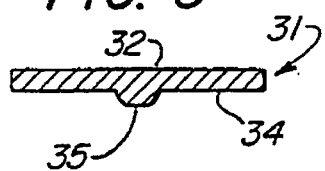
FIG. 5 is a cross-sectional view taken at 5—5 of FIG. 4.

At the center of the belt 11, the side of each channel or groove 13 is provided with a respective circumferential groove, channel, or notch 15, 17, each positioned perpendicular to and opening into groove 13. The grooves 13, 15, 17 are all preferably rectangular in cross-section and have a common flat floor; i.e., they are of the same depth. The grooves 13, 15, 17 are all further of a width which permits them to slidingly receive respective pins 35 of a cooperating metal ring 31 illustrated in FIGS. 4 and 5.

Figure 7:
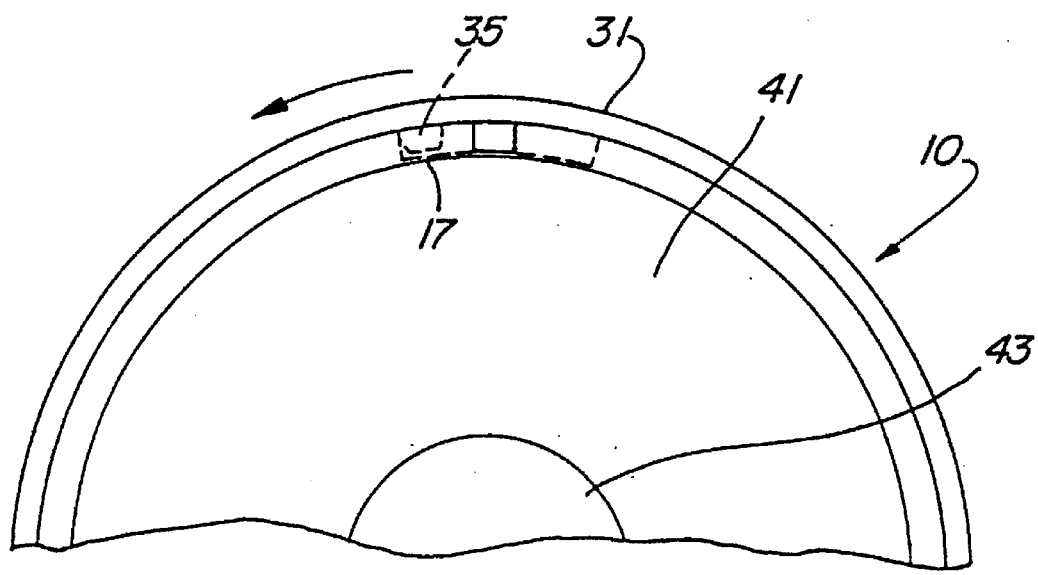

As those skilled in the art will appreciate, the metal band 31 is used to retain the flexible belt 11. The interior 34 of the metal band 31, as well as the pins 35 located thereon, are shaped and dimensioned so that the band 31 may be slid axially relative to the hubs, such as hub 41, during the assembly and disassembly of the coupling 10 so that the band 31 fits over the belt 11, as shown, so as to conform closely to the exterior 14 of the belt 11 when the belt 11 is installed as illustrated in FIGS. 6 and 7. The pins 35 are centered on the interior surface 34 of the metal band 31 and equally spaced apart about the circumference of this interior surface 34 at intervals of 120 degrees.

Each circumferential groove 15, 17 terminates in an end receptacle 18, 20. The end receptacle 18, 20 is somewhat wider than the entrance pathway to it. Similarly, the central portion 22 at the intersection of the axial groove 13 with the circumferential grooves 15, 17 is somewhat larger than the entrance pathways to the central portion 22 provided in the channel 13 and also somewhat larger than the entrance pathways of the respective grooves 15, 17. Central portion 22 thereby forms a third receptacle.

As indicated in FIG. 1, for example, each of the receptacle portions 18, 20, 22 may be generally contoured in cross-section to match an identical circle.

The entrance pathways to the receptacle portions 18, 20, 22 are preferably slightly narrower than the width of the pins 35 such that one feels resistance as the band 31 is forced onto the belt 11. The receptacles 18, 20, 22 (and, hence, the "circle" in FIG. 1) are dimensioned slightly larger to receive and hold one of the pins 35 of the metal band 31, such that one feels the resistance cease as the pins 35 pop into place in any of the receptacle portions 18, 20, 22. Since the pins 35 are not visible during installation, such structure and operation provides a tactile indication of proper positioning of the pins 35.

Representative dimensioning for an entranceway is 0.154 inch for a pin width of 0.184 inch and a receptacle diameter of 0.185 inch. Such dimensioning may, of course, vary as the size of the coupling, ring, and belt vary.

As known in the art, flexible couplings 10 are normally utilized to mechanically connect two aligned or substantially aligned shafts, e.g., 43 (FIGS. 6, 7). The couplings 10 include two separate, identical cylindrical hubs, e.g. 41. Such hubs are typically provided with centrally-located shaft openings which accommodate respective shafts, e.g. 43. Such hubs may be secured to the shafts through the use of conventional set screws or in other conventional manners well-known in the field. Normally, the precise methods of securing the hubs to the shafts will be dependent upon the size of the coupling and the sizes of the shaft with which it is to be used. If desired, the two openings in the two hubs may differ in dimension so as to accommodate shafts of a different dimension.

When the hubs are mounted they are desirably either in axial alignment or are nearly in axial alignment, and they are located on their respective shafts so that projecting teeth or lugs located on their adjacent ends extend generally towards one another. These teeth will normally be spaced a short distance axially from one another so as to avoid their periodically abutting against one another in the event the respective shafts are not in precise alignment.

During installation of the coupling 10, the teeth on the adjacent ends of the hubs will be brought into alignment with one another, as known in the art, through the rotation of one or the other of the shafts as a belt 11 serving as a motion transmitting means is assembled on the hubs, e.g. 41.

According to the preferred embodiment, a two-step procedure is then used to install the metal band 31 on the belt 11 and, hence, on the coupling 10. First, the band 31 is positioned adjacent the belt 11 with each pin 35 aligned with a respective axial groove 13. The band 31 is then forced onto the belt 11, thereby locating each pin 35 in the receptacle portion 22 of its respective groove 13, as illustrated in FIG. 6. The coupling 10 is then rotated by supplying driving power to a selected shaft 41. While the coupling 10 is operating, e.g. at normal speed, it is observed to determine whether the band 31 will slide or "walk" off the belt 11. If so, there is an indication that the respective coupling shafts are grossly misaligned, and the shafts may then be properly aligned until the metal band 31 does not walk off.

After proper shaft alignment, the metal band 31 is then rotated counterclockwise in FIG. 6 about the shaft axis so as to position each pin 31 in the receptacle, e.g., 20 of a respective transverse circumferential groove, e.g., 17, thereby fixing the metal band 31 in position on the flexible belt 11. Alternatively, the metal band 31 can be rotated clockwise such that each pin 31 is located in the receptacle 18 of the opposite circumferential groove 15.

Those skilled in the art will appreciate that various adaptations and modifications of the just-described preferred embodiment can be configured without departing from the scope and spirit of the invention. For example, while receptacles 18, 20, 22 have been particularly disclosed in the preferred embodiment to enhance installation and provide tactile sizing of the relative band/belt position, such receptacle portions could be modified or omitted in other embodiments. The number of axial and cooperating circumferential grooves may also be varied. Therefore, it is to be understood that, within the scope of the appended claims, the invention may be practiced other than as specifically described herein.

What is claimed is:

1. A method of installing a retainer ring having a pin on an interior surface thereof onto a flexible coupling belt of a flexible coupling, said flexible coupling comprising said retainer ring, said flexible coupling belt and first and second hubs, the first hub being fixed to a first shaft, the second hub being fixed to a second shaft and the flexible coupling belt being applied about the first and second hubs and held in place by said retainer ring so as to join said first and second hubs, said belt having at least one axial groove provided in an outer surface thereof, said method comprising the steps of:

provided a circumferential groove in the outer surface of said belt oriented transverse to said at least one axial groove and opening into said at least one axial groove;

positioning the retainer ring on the flexible belt with said pin positioned in the axial groove, thereby joining the first and second shafts together;

rotating the coupling and the first and second shafts after said retainer ring has been positioned on the flexible belt;

detecting whether there is misalignment of the first and second shafts by observing the coupling while it is rotating and, when no misalignment is detected;

responding to the failure to detect misalignment by rotating the retainer ring with respect to said belt such that the pin becomes located in the circumferential groove, thus placing the retainer ring in position such that said circumferential groove resists sliding of said pin axially with respect to the belt.

2. The method of claim 1 wherein the step of detecting comprises detecting walk-off of the retainer ring.

3. The method of claim 2 wherein the misalignment detected is gross misalignment.

4. The method of claim 1 wherein the misalignment detected is gross misalignment.

5. The method of claim 4 wherein said circumferential groove has a pair of side walls, one of which resists axial sliding of said pin after said step of rotating said retainer ring.

6. The method of claim 1 wherein said circumferential groove has a pair of side walls, one of which resists axial sliding of said pin after said step of rotating said retainer ring.

7. The method of claim 1, wherein the step of positioning the retaining ring further comprises the step of pushing the retaining ring onto the flexible coupling belt until a change in resistance indicates that said pin is adjacent said circumferential groove.

8. A method of installing a retainer ring having a pin on an interior surface thereof onto a flexible coupling belt of a flexible coupling, said flexible coupling comprising said retainer ring, said flexible coupling belt, and first and second hubs, the first hub being fixed to a first shaft, the second hub being fixed to a second shaft and the flexible coupling belt being applied about the first and second hubs and held in place by said retainer ring so as to join said first and second hubs, said belt having at least one axial groove provided in an outer surface thereof, said method comprising the steps of:

providing a circumferential groove in the outer surface of said belt oriented transverse to said at least one axial groove and opening into said at least one axial groove, thereby joining said first and second shafts together;

positioning the retainer ring on the flexible belt with said pin positioned in the axial groove, thereby joining the first and second shafts together;

rotating the coupling and first and second shafts after said retainer ring has been positioned on the flexible belt;

detecting whether there is misalignment of the first and second shafts by observing the coupling while it is rotating and, when misalignment is detected;

responding to the detection of misalignment by correcting said misalignment and thereafter rotating the retainer ring with respect to said belt such that the pin becomes located in the circumferential groove, thus placing the retainer ring in position such that said circumferential groove resists sliding of said pin axially with respect to the belt.

9. The method of claim 8 wherein the step of detecting comprises detecting walk-off of the retainer ring.

10. The method of claim 9 wherein the misalignment detected is gross misalignment.

11. The method of claim 9 wherein said circumferential groove has a pair of side walls, one of which resists axial sliding of said pin after said step of rotating said retainer ring.

12. The method of claim 8 wherein the misalignment detected is gross misalignment.

13. The method of claim 8 wherein said circumferential groove has a pair of side walls, one of which resists axial sliding of said pin after said step of rotating said retainer ring.

14. The method of claim 8 wherein the step of correcting said misalignment comprises adjusting the mounting of said coupling, repositioning said ring with said pin in said at least one axial groove, and then rotating said coupling and first and second shafts while observing said coupling to detect whether the first and second shafts are properly aligned.

15. The method of claim 8, wherein the step of positioning the retaining ring further comprises the step of pushing the retaining ring onto the flexible coupling belt until a change in resistance indicates that said pin is adjacent said circumferential groove.

* * * * *